United States Patent [19]
Brzezinski

[11] 3,785,207
[45] Jan. 15, 1974

[54] DIGITAL READOUT INSTRUMENT EMPLOYING ENABLEMENT CIRCUITS FOR SYSTEM WHEN UNDER READING CONDITIONS

[76] Inventor: Janusz Brzezinski, c/o John E. Wagner, 1041 E. Green St., Suite 202, Pasadena, Calif. 91106

[22] Filed: June 28, 1971

[21] Appl. No.: 157,465

[52] U.S. Cl. .......................................... 73/362 AR
[51] Int. Cl. ............................................. G01k 7/24
[58] Field of Search .............................. 73/362 AR

[56] References Cited
UNITED STATES PATENTS

| | | | |
|---|---|---|---|
| 3,702,076 | 11/1972 | Georgi............................ | 73/362 AR |
| 3,461,724 | 8/1969 | Tong et al. ..................... | 73/362 AR |
| 3,550,448 | 12/1970 | Ensign........................ | 73/362 AR X |
| 3,360,993 | 1/1968 | MacMillan......................... | 73/361 |
| 3,604,266 | 9/1971 | Chilton............................ | 73/362 AR |
| 3,477,292 | 11/1969 | Thornton ....................... | 73/362 AR |

Primary Examiner—Richard C. Queisser
Assistant Examiner—Frederick Shoon
Attorney—John E. Wagner

[57] ABSTRACT

A digital readout thermometer employing a resistance bridge with a temperature sensitive element such as a thermistor in one leg of the bridge and including a motor driven adjustable resistance or potentiometer for rebalancing the bridge. A servo amplifier, d.c. motor and digital counter provide a reading indicative of the temperature. The circuit includes a differentiator for accelerating the time response of readout. It also includes timer, a comparator, logic circuit and visual indicator for enabling the readout system only when the transducer senses the temperature in the range to be read and the logic circuit is operative to enable the visual indicator when a temperature in the required range has been sensed for a period sufficient for the counter to complete its movement to the correct reading. The thermometer is automatically powered when the probe is removed from its storage tube.

14 Claims, 6 Drawing Figures

3,785,207

DIGITAL READOUT INSTRUMENT EMPLOYING ENABLEMENT CIRCUITS FOR SYSTEM WHEN UNDER READING CONDITIONS

RELATED INVENTIONS

This application is an improvement upon my invention described in co-pending application Ser. No. 135,338 filed Apr. 19, 1971 which in turn in a continuation in Part of my application 32,142 filed Apr. 27, 1970, and now abandoned.

BACKGROUND OF THE INVENTION

In my above identified patent applications I have disclosed a digital readout thermometer designed for use in measuring the human temperature employing a transducer which is brought into contact with the portion of the body to be sensed, a bridge switch for measuring the temperature with respect to a standard, and a digital readout device which is powered by a d.c. motor under the control of a dual d.c. power supply. This electronic thermometer of my invention provides accuracy of measurement in the order of ± 1/10°; and far greater than is available using conventional glass thermometer. This improved accuracy, however, also results in a sensitive response of the thermometer under a slight change in temperature which can result in change in contact of the probe with the body. Likewise with such an accurate measuring device which is of a null seeking nature, the balancing of the bridge at the null occurs at a final lower speed which is sometimes termed as a creeping of the digital readout. As a result, this improved accuracy in the thermometer has produced some uncertainty on the part of the user at the time to take a reading. An accurate reading can be obtained in approximately 15 seconds but a slight creeping thereafter can occur and an over-zealous person taking a reading may take a minute or more watching for additional movement of the digital readout. This longer period for reading also results in increase in battery consumption and does not necessarily produce a more accurate reading.

Prior art electronic thermometers have not solved the problems of response, creeping, unnecessary battery drain or the need for a visual indication of the correct time to read the thermometer.

BRIEF STATEMENT OF THE INVENTION

Given the background on the invention, I have invented an improved electronic thermometer in which the digital readout system is inoperative until a temperature in excess of a predetermined level, for example, 94° is sensed by the probe. I have also included a timer means for timing the period after sensing a temperature in excess of a predetermined level for enabling the digital readout circuit whereupon the electronic circuit is capable of advancing to the sensed reading. I have also discovered that it is possible using a logic circuit and indicator to give a visual indication of the correct time to read the temperature.

Therefore, employing this invention, the user need only replace the transducer in contact with the body to be sensed and watch for the indicator light to come on which may be in the matter of a few seconds and then remove the transducer. The digital readout device holds the reading.

I have also included in my invention a switch means which is actuatable by removal of the probe from the storage device for enabling the circuit, thereby eliminating the need for any other manual switch and eliminating any excess current drain.

BRIEF DESCRIPTION OF THE DRAWINGS

The following features of this invention may be more clearly understood from the following detailed description and by reference in the drawing to which.

DETAILED DESCRIPTION OF THE INVENTION

Figure 1:
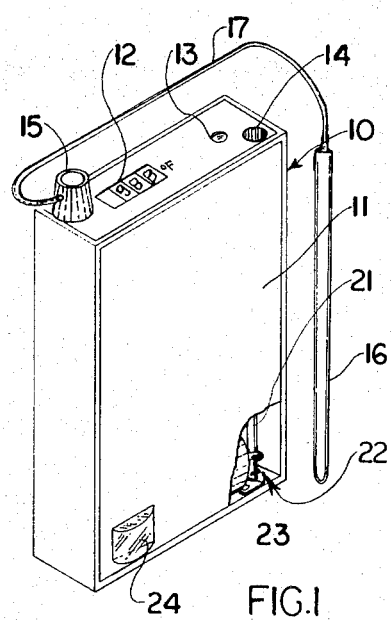
FIG. 1 is a perspective view of an electronic thermometer in accordance with this invention with portions broken away for clarity.

Now referrring to FIG. 1, an electronic thermometer 10 in accordance with this invention may be seen as including a housing 11 of generally rectangular shape and design to be hand carried or in a strap supported carrying case in the position shown. The top surface includes a visual temperature indicator in the form of a digital readout device 12. The top surface also includes a lamp 13 a probe receiver or tube 14 and a probe jack (unshown). Plug or connector 15 is inserted in the probe jack to connect a probe 16 via lead 17 to the thermometer 10. The probe is an elongated plastic body with a temperature sensitive resistance element or thermistor 20 imbedded in its tip.

The probe 16 is normally stored in its receiver 14 with the tip of the probe extending nearly to the bottom of the housing 11. As is shown in the cutaway portions of FIGS. 1 and 2, the side wall of the probe 16 contacts a spring contact 21 of a switch 22 to maintain the switch 22 open whenever the probe 16 is in its receiver 14. Switch 22 is the main power switch from the batteries of the device one of which battery 23 appears in the drawing. Therefore all power for the circuit is interrupted during storage of the probe and power is automatically applied to the sensing circuit whenever the probe 16 is removed from its receiver 14. The front face of the housing 19 also includes a battery condition meter 24 visible to the user.

Figure 2:
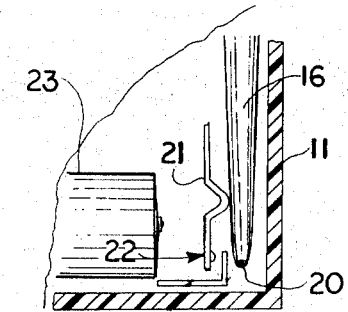
FIG. 2 is a fragmentary portion of the thermometer of this invention.
Figure 3:
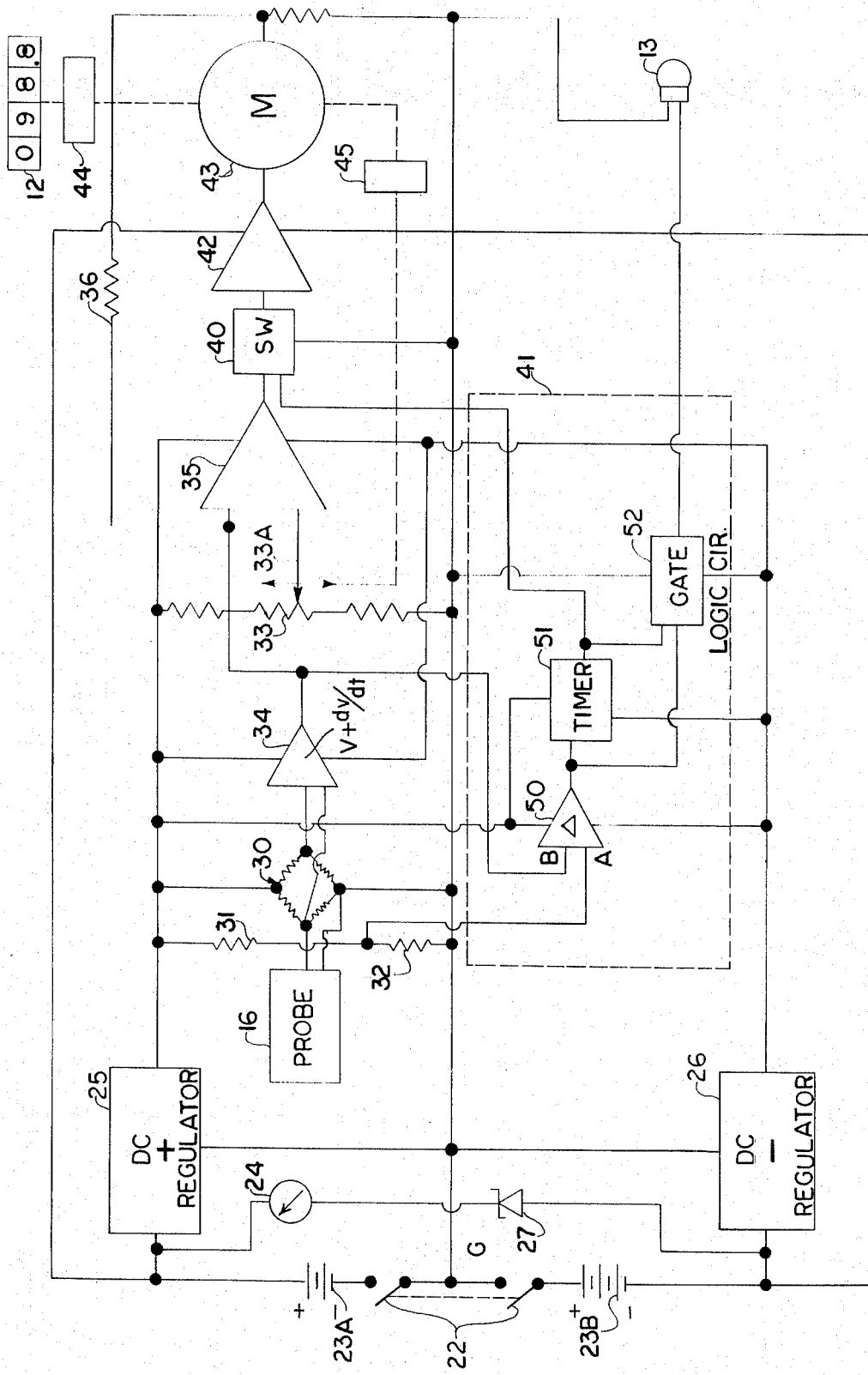
FIG. 3 is a block diagram of the improved circuit of this invention.

In addition to the full automatic powering of the circuit via the switch 22 of FIGS. 1 and 2, several other features of this invention are present in the circuitry as shown in FIG. 3. The basic double D.C. power supply, bridge and servo circuits are of the type disclosed in my copending Continuation application referenced above and the details and operation of the basic circuit thereof may be best understood by reference to that application. Suffice it to say, the circuit includes a pair of batteries 23A and B series connected with a center tap system ground G and switch 22 for applying power from the batteries 23 to respective voltage regulators 25 and 26. A battery condition meter 24 is connected accross opposite poles of batteries 23 in series with a zener diode 27. This zener diode 27 is selected with a zener or breakdown voltage of approximately 75 percent of the normal terminal voltage of the batteries 23, e.g. a 14 volt zener for use with two 9 volt batteries. The meter will then read full scale for a normal full terminal voltage and zero for any terminal voltage of less than 14 volts. This arrangement presents a clear indication of a slight drop in battery terminal voltage to allow replacement before the accuracy of readings is affected.

The voltage regulators 25 and 26 as disclosed in my copending patent application referenced above are preferably zener regulators with RC low pass filters to provide a dual polarity regulated voltage to the temperature sensing circuit.

The basic sensor, probe 16 is connected in one leg of a resistance bridge 30. Two nodes of the bridge are connected to the regulated supply meter 33. The leg of bridge 30 opposite the probe 16 is connected to a differentiator, amplifier 34 which provides a voltage output which is a function of the voltage and rate of change of voltage across the bridge. It typically is an amplifier with a parallel R.C. circuit at its input. The presence of differentiator amplifier 34 accelerates the response of the thermometer without affecting its accuracy of the reading. This signal is applied to the input of a servo amplifier 35 in the servo circuit of the thermometer. The output of amplifier 35 is a function of the bridge balancing voltage of potentiometer 33, signal from differentiator amplifier 34 and motor current fed back through a resistance 36. The operation of the bridge and servo of this invention with the exception of the differentiator amplifier 35 and a switch 40 and logic circuitry 41 is identical with that of my copending patent application and reference is made thereto for the details of operation. Suffice it to say, that signals from differentiator amplifier 35 and bridge unbalance signals on the wiper 33a combined in amplifier 35 and passed through switch 40 (when in conducting condition) to a current amplifier 42 to drive motor 43. The motor 43 is mechanically coupled to the digital readout 12 through a reduction gear 44. The motor 43 is also coupled through a gear train 45 to the wiper arm 33a to rebalance the potentiometer 33 to reduce the output signal of amplifier 35 to zero.

The other novel features of this invention involve particularly the logic circuitry 41. This circuitry employs basically a voltage comparator 50 a timer 51 and a gate 52 as well as switch 40.

The comparator 50 has a pair of input leads A and B. The lead A is connected to the center tap between resistances 31 and 32 whereby the potential of the input A is equivalent to a selected measured temperature, e.g. 94°F. The lead B is connected to the output of the differentiator amplifier 34.

The output of the differentiator amplifier 34 is the differentiated amplified output of the bridge 30. Therefore the output is a function of the temperature measured by the probe 16. This relationship may be represented by the following equation:

$$E_o = f(T_{in} + dt/d\tau)$$

where $T_{in}$ is the temperature sensed by the probe 16 and $dT/d\tau$ is the derivative of temperature with respect to time.

As the bridge becomes balanced, the time rate factor approaches zero and the input B represents the T factor alone, or in other words, represents the Probe temperature.

The differentiation function allows the system to respond at a faster rate in balancing the servo system than in the case of a measurement based upon direct measurement of temperature alone. Of course, a direct measurement of temperature as indicated by the bridge unbalance could optionally be used in accordance with conventional wheatstone bridge technology. However, the differentiator-amplifier approach is preferred. The comparator 50 produces an output pulse whenever the voltage on lead B exceeds that of lead A, i.e., the probe temperature is above the selected temperature. This condition triggers timer 51 which may be a one shot multivibrator having a pulse length of several seconds, sufficient time for the probe temperature to approach the patient's temperature. Timer 51 enables switch 40, at the beginning of its timing cycle, allowing current to flow to the motor 43 to drive counter 12 and rebalance the potentiometer 33. After the potentiometer 33 is rebalanced and the counter 12 displays the sensed temperature and the timer 51 pulse is passed, gate logic applies operating current to lamp 13 indicating the time to read the patient's temperature.

Figure 6:
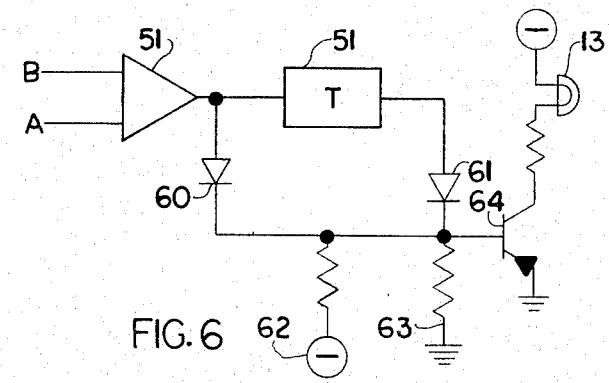
FIG. 6 is an electrical schematic diagram of a logic circuit preferred for use in the embodiment of FIG. 3.

The logic circuit 41 providing these functions is shown in FIG. 6. The comparator 50 produces an output current through diode 60 whenever B ≥ A and simultaneously starts timer 51. The output of timer 51 through diode 61 and combination with a negative voltage supply 62 snd ground connection 63 establish the base bias of a PNP transistor 64. The emitter and collector of transistor 64 are connected in the lamp 13 power circuit. As connected, the lamp 13 is powered through transistor 64 whenever the base of the transistor 64 is negative biased by supply 62. This occurs when comparator is in its on or 1 condition and timer is off (0). Below is a truth table for the logic circuit 41.

| Comparator | Timer 51 | Motor 43 | Lamp |
|---|---|---|---|
| B ≥ A | 0 | 0 | 1 |
| B ≥ A | 1 | 1 | 0 |
| B < A | 0 | 0 | 0 |

Figure 4:
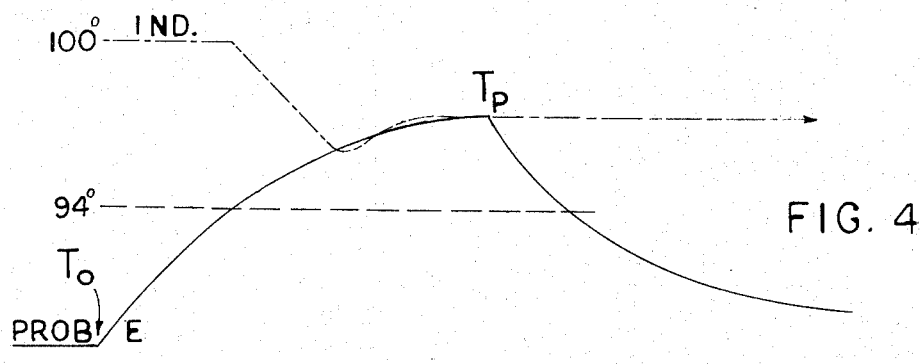
FIG. 4 is a graphical representation of the operation of this invention.

Now refer to FIG. 4 where the curve of operation of the system are illustrated. The solid curved line denotes the temperature of the probe sensor 20 of FIG. 1 upon insertion in the patient's mouth starting from ambient temperature $T_0$. The probe increases in a smooth temperature rise curve until removed from the patient's mouth at temperature Tp whereupon it falls toward the ambient.

As illustrated by the dash dot line, the indicator had a previous reading of 100° and remains at that reading until the servo circuitry is enabled. This occurs when the probe temperature exceeds a preselected value, e.g., 94° shown by the intersection of the dashed and solid lines. At this instant the comparator 50 of FIG. of FIG. 3 produces an output pulse of (1) condition starting both the timer 51 and motor 43 as denoted by the (1) condition. After the timer passes its preselected time interval and return to an off (0) position, the motor likewise is deenergized. Lamp 13 is enabled and remains illuminated as long as the comparator is in its (1) condition.

The indicator follows the dash dot line as illustrated falling to meet the rising probe temperature line, with a small undershoot and overshoot and stabilizing after the period of the timer interval. The indicator then with motor current removed holds the same reading until a new reading is taken. No resetting is required.

Given the foregoing features of this invention, I have truly an automatic thermometer with the sensing circuitry powered only when the probe is removed from its storage position and with the servo circuit powered only when temperatures above a selected value are sensed. Logic circuitry lights a lamp when the above conditions have been met and sufficient time has passed to establish an accurate reading. Subsequent creeping of the readout is prevented by the logic circuit which removes power from the servo circuit during and after the reading condition.

Figure 5:
FIG. 5 is a block diagram of an alternate embodiment of this invention.
Figure 5:
Figure 5:
Figure 5:
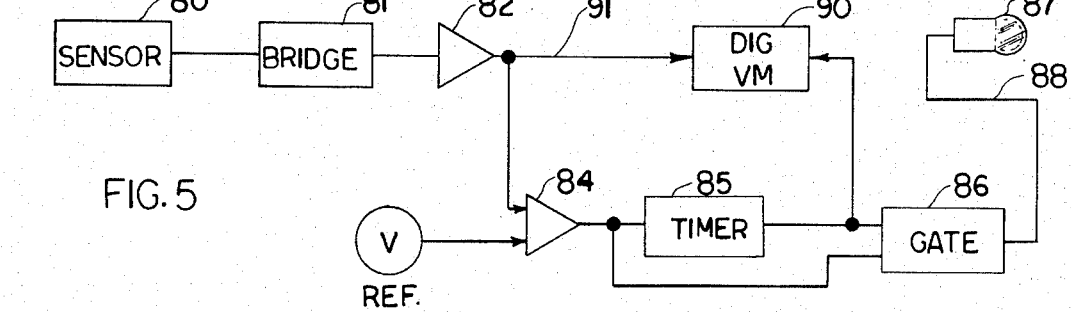

In the foregoing description, the electronic thermometer of this invention is totally portable and self powered. In certain applications such as intensive care needs of hospitals, portability is not required and in fact a permanent installation for each patient is desired. Under these circumstances, the circuit of FIG. 5 is preferred. It employs a sensor or probe 80 connected to bridge 81, a differentiator and amplifier 82, comparator 84, timer 85 and gate 86 and indicator lamp 87 all equivalent to the same components in the circuit of FIG. 3. In place of the servo system of FIG. 3, in this embodiment a digital voltmeter 90 provides the visual readout of temperature. The voltmeter 90 and lamp 87 may be located at the patients bedside or at a central monitoring station if desired. In any case, the system of FIG. 5 employs the same logic of FIG. 3 and provides the same automatic operation and a visual "time to read" signal. The system of FIG. 5 includes comparator 84 connected to the bridge 81 and the differentiator amplifier 82 to compare any bridge unbalance indicative of a temperature sensed by sensor 80 in excess of a selected value e.g. 95°. Comparator 84 enables timer 85 which may be a one shot multivibrator having an output pulse of selected length, for example 6 seconds.

The timer 85 provides an enabling input to the digital voltmeter 90 to cause it to display the temperature signal appearing on lead 91. The timer 85 and comparator 84 also enable gate 86 after the time interval thereupon lighting lamp 87. Therefore similar to the embodiment of FIG. 3, the readout digital voltmeter 90 is enabled and the lamp 87 illuminated during the period when a reading may be taken. In certain cases, digital voltmeters may be used which are dark when not enabled and illuminated when displaying a reading. When using such a display, the lamp 87 may be eliminated and the lead 88 instead connected as the enabling input to the digital voltmeter 90. In this case, the reference voltage for the comparator is an independent reference voltage source in contrast with the embodiment of FIG. 3. In fixed installations such an independent reference may be desired.

It is recognized that following the teaching of this invention, one could, through minor changes within the scope of teaching, produce variations which carry out the substance of the invention while having minor difference in detail. Therefore, the monopoly afforded by this patent shall not be restricted to the foregoing specific embodiments but instead by the invention as described in the following claims and their equivalents.

I claim:

1. Electronic thermometer comprising:
   a probe having temperature sensitive element therein,
   an enclosure,
   circuit means within said enclosure for determining temperature of the temperature sensitive element of said probe;
   said circuit means including sensing circuit and a servo followup circuit,
   a temperature display connected to be driven by said servo followup circuit,
   said enclosure including a recess for storing said probe when not in use;
   first switch means responsive to removal of said probe from said recess for applying operating power to said sensing circuit; and
   second switch means responsive to operation of said first switch means plus the sensing of a predetermined minimum temperature by said sensing circuit for applying operating power to said servo followup circuit.

2. The combination in accordance with claim 1 including differentiator amplifier means connected between said sensing circuit and said servo circuit for producing an output signal for driving said servo circuit related to the temperature and rate of change of temperature sensed said probe.

3. The combination in accordance with claim 1 wherein said means responsive to said temperatures above the preselected minimum comprises a comparator amplifier including one input terminal connected to a reference voltage source and a second input terminal connected to said sensing circuit to produce a signal whenever the sensing circuit detects a voltage above the reference voltage.

4. The combination in accordance with claim 3 including switch means responsive to the output of said comparator amplifier for enabling the servo circuit.

5. The combination in accordance with claim 4 including a timer responsive to the output of said comparator for limiting the time of enablement of said servo followup circuit to a period sufficient for said servo followup circuit to make the maximum followup adjustment.

6. An electronic thermometer comprising
   a probe including a temperature sensitive element therein,
   a sensing circuit for producing an electrical signal related to the temperature sensed by said probe,
   an indicator,
   a servo circuit for driving said indicator to a reading indicative of the temperature sensed by said probe,
   a reference signal source,
   comparator means for comparing the electrical signal produced by said sensing circuit with said reference signal and for enabling said servo circuit only when said former signal exceeds the reference signal, and
   timer means for limiting the time of enablement of said servo circuit to a time sufficient to followup to the temperature sensed.

7. The combination in accordance with claim 6 wherein said timer is connected to said comparator to be enabled by the signal from said comparator.

8. An electronic thermometer comprising:
   a probe including a temperature sensitive element therein;

a sensing circuit for producing an electrical signal related to the temperature sensed by said probe;
a temperature display;
a servo circuit for driving said temperature display to a reading indicative of the temperature sensed by said probe;
a reference signal source;
comparator means for comparing the electrical signal produced by said sensing circuit with said reference signal and for enabling said servo circuit only when said former signal exceeds the reference signal;
timer means for limiting the time of enablement of said servo circuit to a time sufficient to followup to the temperature sensed; and
indicator means for producing a signal to the user of the beginning of the period of time during which said display registers the probe temperature.

9. The combination in accordance with claim 8 wherein said indicator is a lamp and including means for lighting said lamp following the enabling of said timer.

10. The combination in accordance with claim 9 including logic means for enabling said lamp responsive to an enabling signal from said comparator and after the termination of signal from said timer whereby said lamp is illuminated only after a temperature above a predetermined minimum is sensed and after the necessary time for said servo followup system to move said indicator to a temperature reading equal to the temperature sensed by said probe.

11. The combination in accordance with claim 10 including means for extinguishing said lamp whenever said probe is at a temperature less than the said predetermined minimum.

12. The combination in accordance with claim 11 wherein said lamp extinguishing means comprises said comparator.

13. The combination in accordance with claim 10 including gate means responsive to a signal from said comparator and the end of a timing period of said timer for illuminating said indicator.

14. The combination in accordance with claim 13 wherein said gate responds to the absence of a signal from said comparator to extinguish said indicator.

* * * * *